United States Patent

Sakamoto

[15] 3,684,865

[45] Aug. 15, 1972

[54] APPARATUS FOR INFORMATION RETRIEVAL

[72] Inventor: Isamu Sakamoto, Amagasaki, Japan

[73] Assignee: Konan Camera Laboratory Company, Ltd., Kobe, Japan

[22] Filed: May 27, 1970

[21] Appl. No.: 40,782

[30] Foreign Application Priority Data

June 11, 1969 Japan ......................44/46428

[52] U.S. Cl. ......................235/61.11 E, 250/219 DC

[51] Int. Cl. ..............................................G06k 7/14

[58] Field of Search ...........235/61.11 E, 61.11, 61.7; 209/111.7, 80.5; 340/173 LM, 174.1 C

[56] References Cited

UNITED STATES PATENTS

| | | | |
|---|---|---|---|
| 3,272,205 | 9/1966 | Shrewburg | 209/111.7 |
| 3,034,643 | 5/1962 | Keller et al. | 235/61.12 |
| 3,512,130 | 5/1970 | Hulett | 235/61.12 UX |
| 3,341,070 | 9/1967 | Hertrich | 340/174.1 C |

*Primary Examiner*—Maynard R. Wilbur
*Assistant Examiner*—William W. Cochran
*Attorney*—Craig, Antonelli & Hill

[57] ABSTRACT

One data card, such as a microform card, from rows of thousands of cards in a storage shelf can be automatically selected by means of an optical reading system in which an optical code reader optically reads out visual codes for information retrieval, said codes consisting of opaque marks and transparent marks provided on an edge of every card. An output electric signal obtained from the optical reader is usable for controlling mechanical means for retrieving the card.

9 Claims, 5 Drawing Figures

INVENTOR
ISAMU SAKAMOTO
BY
Craig, Antonelli, Stewart + Hill
ATTORNEYS

INVENTOR
ISAMU SAKAMOTO
BY
Craig, Antonelli, Stewart & Hill
ATTORNEYS

APPARATUS FOR INFORMATION RETRIEVAL

BACKGROUND OF THE INVENTION

This invention relates to an apparatus for retrieving (selecting and picking out) a desired card from a row of a large number of cards in a short time.

In accordance with the recent developments in information handling techniques, it has become a frequent necessity to pick up a desired microform card or a computer card from a shelf on which thousands of cards are stored. Hitherto, a system of retrieval of a desired card from rows of cards having punched holes in accordance with a certain code by means of an automatic punched card sorter and another system of retrieval of a desired microform card from rows of microform cards having iron pieces arranged thereon in accordance with a certain code by means of a set of magnets have been devised to meet such needs. However, the former system has a shortcoming in the selection speed and the latter system has the inconvenience of requiring the attachment thereto of iron pieces.

The present invention proposes to provide a new apparatus capable of selecting with reliability one desired card from a row of many cards in a very short time by employing an improved optical code reading system. The card referred to in connection with this invention includes a card, film or a thin board having any type information on it, in a form of letters, characters, patterns, holes, or a magnetic record.

SUMMARY OF THE INVENTION

Apparatus for information retrieval according to the present invention is characterized by means for holding cards having optical code marks on at least one edge of each card, in a row or rows with a specified gap between each card and oriented transverse to the direction of the row at an incline therewith so that said edges of all cards can be seen from outside the row, and one or more optical code readers which read out said optical code marks while scanning them along the direction of said row.

BRIEF EXPLANATION OF THE DRAWING

These and other objects of this invention will become apparent from the following description of a preferred embodiment with reference to the accompanying drawing, in which.

DETAILED DESCRIPTION OF THE INVENTION

Figure 1:
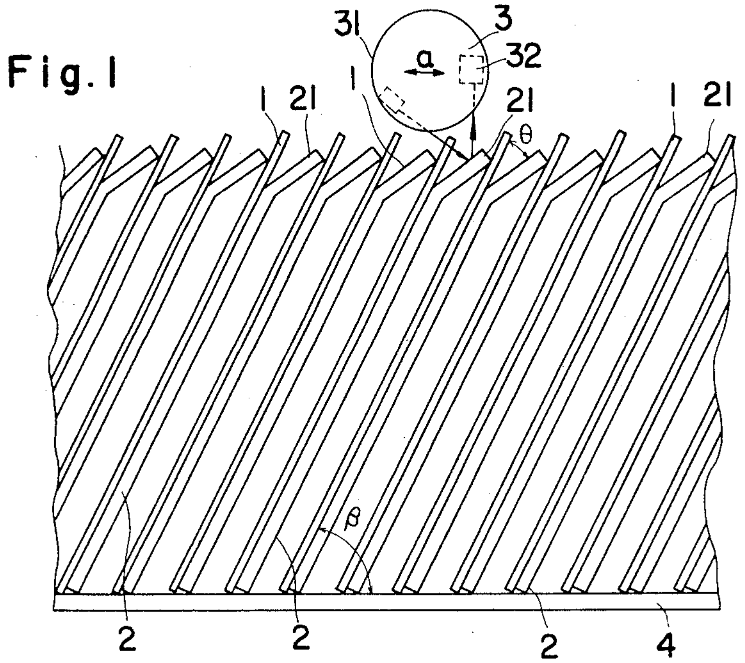
FIG. 1 is an enlarged side view of a part of a row of cards held in a card holder in an apparatus for information retrieval embodying the present invention.

In FIG. 1, cards 1, 1, 1 . . . are each inserted between a pair of spacers 2 in a row of spacers 2, 2, 2 . . . and are held in a row of cards spaced at a specified even gap inbetween and are inclined to the horizontal direction facing the direction of the row. Said spacers 2, 2, . . . are preferably made of glossy material, for instance, chrome-plated brass, and are fixed to a base tray 4 at a specified angle $\beta$ thereto. The top edge of each of the spacers 2, 2, . . . is bent at a specified angle $\theta$ against the rear face of the card 1 so as to form a reflection mirror 21.

Figure 2:
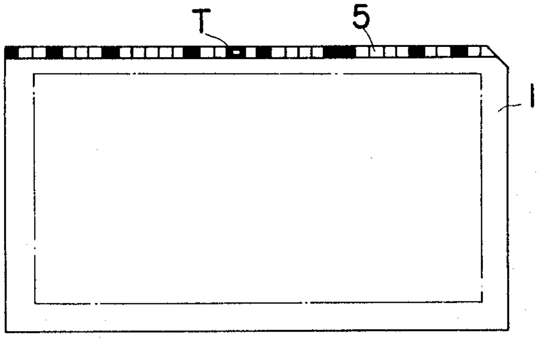
FIG. 2 is a front view of a card.

On the top of each of the cards 1 are provided optical code marks 5, as illustrated in FIG. 2. The code marks 5 are black marks and transparent marks combined so as to compose a code for retrieval. Moreover, around the center of the top edge is provided a position-detecting code mark T which is constituted by a small transparent window part in a surrounding black area. Since the positional tolerance for reading this small window part is very small, this mark T serves optically to confirm the correct position of a card when the code of the card is being read by an optical code reader 3.

The optical code reader 3 is so made as to move along a rail (not shown in the Figures) in a direction indicated by arrow *a* in FIG. 1, namely in the direction of the row of cards, so as to scan closely over said top edges of the cards. Such movement should preferably be effected by an electric motor (not shown in the Figures). The radar 3 is shaped in the form of a cylinder having its axis parallel to the top edge of the card 1, and contains many sets of said optical reading units arranged across the full width of the reader 3 so as to catch light beams from each of the optical code marks 5 across the full width of the top edge of the card. Each of said optical reading units comprises a light emitter 31 and a light receiver 32.

Figure 5:
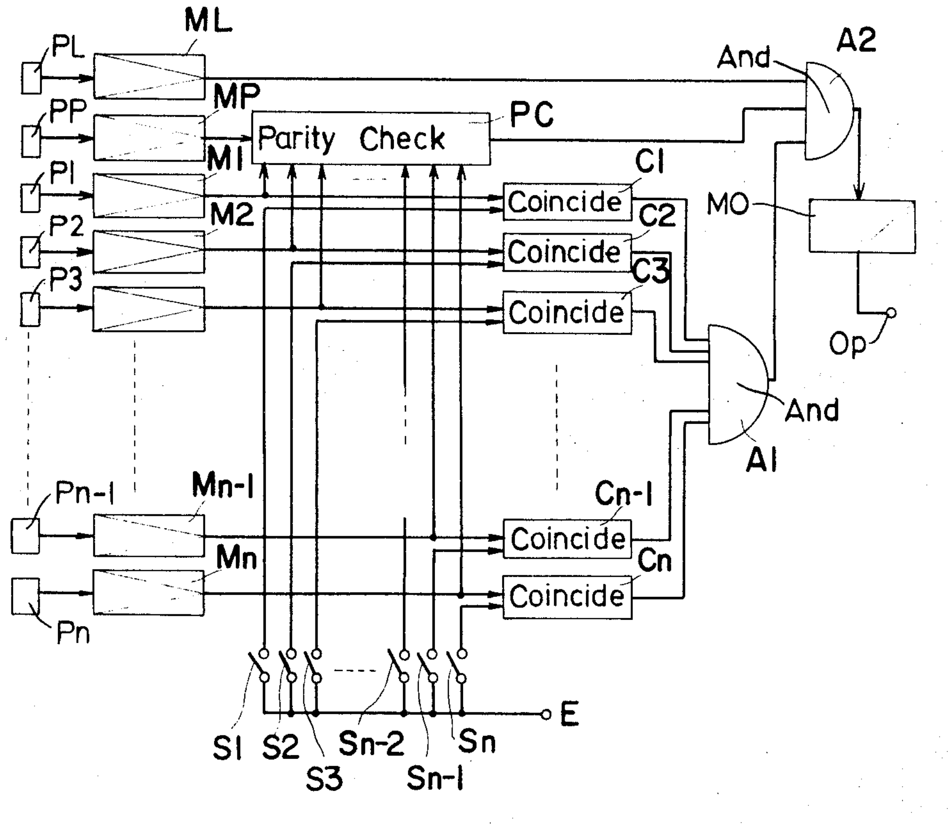
FIG. 5 is a block diagram of an exemplary electric circuit for handling signals obtained from the reader of the present invention.

In the exemplary schematic block diagram shown in FIG. 5, references PP, P1, P2, P3, . . . P$n$−1 and P$n$ designate photoelectric transducers, such as phototransistors, contained in the respective light receivers 32, 32, . . ., one being provided for each of the code marks on a card. PL designates a photoelectric transducer, contained in a position-detecting light receiver to receive light from said position-detecting code mark T. References ML, MP, M1, M2, . . ., M$n$−1 and M$n$ designate amplifiers for amplifying and shaping signals from transducers PL, PP, P1, P2, . . ., P$n$−1 and P$n$, respectively. PC designates a parity check circuit for checking the reliability of the output signals of transducers PP, P1, P2, . . ., P$n$−1 and P$n$ by means of parity check. S1, S2, S3, . . ., Sn−1 and Sn designate selection switches for selectively imparting gating signals to respective coincidence-circuits C1, C2, C3, . . ., C$n$−1 and C$n$. These coincidence circuits C1, C2, . . . Cn give output signals to a first AND-gate circuit A1 when two input signals coincide, namely, when one input signal "1" from a corresponding amplifier coincides with the other input signal "1" caused by a closed corresponding switch, and when one input signal "0" from a corresponding amplifier coincides with the other input signal "0" caused by an open corresponding switch. A second AND-gate A2 applies its output signal to a power amplifier MO when output signals from the amplifier ML, from the parity check circuit PC and from the first gate A1 coincide. The output signal of the power amplifier MO is obtainable at an output terminal Op.

The foregoing circuit arranged operates as follows:

The light beams emitted from light emitters in the optical code reader 3 are directed at the code mark 5. When a light beam is directed at a transparent part of the code mark 5, the light beam penetrates the card and is reflected by the reflection mirror 21, which reflected light shoots at the light receiver that pairs with an optical reading unit. When a light beam is directed at a black, namely opaque, part of the code mark 5, the light beam is absorbed or blocked by this black part. Consequently, no light reaches the light receiver.

Thus, output signals are obtained only from the amplifiers corresponding to the code readers that are illuminated by reflected light from the surface portion 21 of the spacer 2.

Since each surface of the reflection mirror 21 is so made and oriented as to have a specified angle of $\theta$ with the surface of the card 1, as illustrated in FIG. 1, each input light beam received by the light receiver 32 is limited to the light that has penetrated the code mark 5 of the card. Namely, spurious lights which are reflected by the surface of the card do not shoot at the light receivers, and consequently, the signal-to-noise ratio of the output signal of each transducer is very high.

As is already mentioned above, since the optical code reader 3 contains a set of reading units arranged in a direction parallel to the top edge of the card 1 where the optical code marks 5 are provided, a complete set of the code marks 5 across the top edge of a card can be read out simultaneously. This simultaneous optical reading is an advantageous feature of the present invention, because the reading per card can be made much quicker in comparison with the conventional punched card sorting system. As is mentioned above, the code reader is driven to move in the direction of the row of cards, and therefore, each light receiver receives reflected lights from one card after another while scanning over the card edges, thereby providing many combinations of electric output signals in rapid sequence.

In FIG. 5, which illustrates a block diagram of an exemplary electric circuit for handling the above-mentioned electric output signals, when the code reader 3 comes to the right position to read the code marks 5 of a card 1, the transducer PL receives a light beam which is reflected by the reflection mirror 21 after penetrating the small transparent window of the position detecting code mark T, and consequently, the amplifier ML provides an output signal to the AND-gate A2. At the same time, other transducers receive the light beam and apply output signals to respective amplifiers connected thereto when transparent code marks face thereto, and they do not receive the light beam and do not apply the output signals to the respective amplifiers when black code marks face thereto. Therefore, when an output signal from an amplifier coincides with the signal given by closing a corresponding selecting switch, the corresponding coincidence circuit provides a signal to the AND-gate A1, causing the AND-gate A1 to provide an output to the AND-gate A2. When the code marks 5 of a card coincide with the setting of the selection switches, all coincidence-circuits C1 to Cn provide output signals to AND-gate A1. When all the code marks including the parity check mark are correctly read by the respective light receivers, the parity check circuit PC applies an output signal to the AND-gate A2. Upon completion of three signals to the AND-gate A2 from three sources, namely, from the position-detecting transducer PL, from the parity check circuit PP and from AND-gate A1, the AND-gate A2 applies an output signal to the power amplifier MO causing it to provide driving output power to the output terminal Op.

The output power obtainable from the terminal Op can be utilized, for instance, for instantly stopping scanning motion of the code reader 3 so as to indicate location of the desired card 1, and/or for instantly driving a known card retrieval device (not shown in the Figures).

Figure 3:
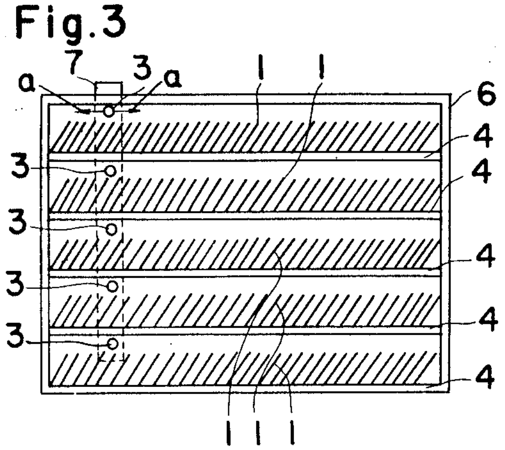
FIG. 3 is a partial side view of the apparatus.

In FIG. 3, which is an abridged side view of an exemplary apparatus for retrieval of data from large quantities of stored information, cards 1, 1, . . . are stored in five rows, respectively, held on five trays 4, 4, . . . in a shelf 6. Although spacers such as illustrated in FIG. 1 are fixed, for instance, to trays 4, they are omitted in FIG. 3 in order to make the Figure concise. Five code readers 3, 3, . . . fixed to a common movable rod 7 are arranged to scan closely over the top edges of the cards 1, 1 . . . , respectively. The rod 7 is driven in a direction parallel to the rows of cards as shown by arrows *a*, *a*, by for instance, an electric motor (not shown in FIG. 4), and causes the respective code readers 3, 3, . . . to scan jointly.

In the foregoing retrieval apparatus, provided that cards 1, 1, . . . are arranged with respective gaps of 2.5 mm. between each other, and that the code reader 3 scans at the speed of 30 cm. per second, one card from rows of several hundred thousands of cards can be retrieved in only a few seconds.

Figure 4:
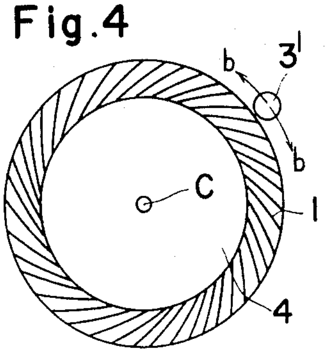
FIG. 4 is a partial plan view of another apparatus embodying the present invention.

In FIG. 4, which illustrates another example of the present invention, cards 1 are arranged in a circular row being spaced from each other and disposed at an angle to the radius of the circle, by a row of spacers, so that one corresponding edge of all cards can be seen from outside of the circular row. Although omitted in FIG. 4, said spacers are substantially the same as the spacers 2 of the foregoing example, and are fixed to, for instance, a circular base tray 4 at a specified angle $\beta$ with the tray 4. A code reader 3′ of this example has a vertical cylindrical shape and is made rotatable around the center C of the circular row (as shown by arrows *b*, *b*) so as to scan and read code marks on the outer perpendicular edge of each card 1. Similarly to the code reader 3 of the foregoing example, the code reader 3′ of this example contains a number of pairs constituted of a light emitter and a light receiver arranged at a specified vertical position, respectively, so as to catch light from each of the code marks on the edge of the cards. For the circuit arrangement used with this apparatus, the circuit illustrated in FIG. 5 can be employed also.

A modified example can be constituted by making the row of cards 1, 1 . . . rotatable and the code reader 3 fixed.

Although the abovementioned examples are for retrieving cards having optical card marks constituted by black or opaque and transparent marks, code marks of the cards are not limited to the said combination. That is to say, code mark combinations of metallic-glossy marks and black marks or metallic-glossy marks and non-reflective vacant hole marks, and so on, can be employed in this apparatus.

Since the apparatus of the present invention is capable of simultaneous reading-out of a large number of code marks, and also is of an optical retrieving system, it is capable of readout out by a high-speed scanning, and therefore, is able to scan over a large number of cards in a very short time for retrieving.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What I claim is:

1. Apparatus for information retrieval comprising:
means for holding cards, having optical code marks at least at one edge of each card, in at least one row of cards with a specified gap between each card and in obliquity to the direction of the row, so that each said edge of all cards can be seen from outside the row, said means for holding cards including at least one row of spacers which hold each of said cards with a specified gap from each other, each of said spacers having a narrow reflection mirror which faces at a specified angle to the surface of each card where said optical code marks are provided; and
at least one optical code reader to read out said optical code marks while scanning them along the direction of said row.

2. Apparatus as defined in claim 1, wherein said optical code reader includes light emitter means for directing light at said optical code marks on each card and light receiver means for receiving light from said light emitter means reflected off of said reflection mirror on each spacer after passage through selective code marks on an adjacent card.

3. Apparatus as defined in claim 2, wherein said light emitter means includes a plurality of light sources equal in number to the number of code marks on each card, and said light receiving means includes a plurality of light detectors equal in number to said light sources.

4. Apparatus for information retrieval comprising:
means for holding cards having optical code marks on at least one edge of each card, in at least one circular row with a specified gap between each card and in obliquity to the normal of said circular row or rows, so that each said edge of all cards can be seen from outside the row, said means for holding cards including a circular row of spacers which hold each of said cards with a specified gap from each other, each of said spacers having a narrow reflection mirror which faces in a specified angle to the surface of each card where an optical code mark is provided; and
at least one optical code reader to read out said optical code marks while scanning them along the direction of said row.

5. Apparatus as defined in claim 4, wherein said optical code reader includes light emitter means for directing light at said optical code marks on each card and light receiver means for receiving light from said light emitter means reflected off of said reflection mirror on each spacer after passage through reflective code marks on an adjacent card.

6. Apparatus as defined in claim 5, wherein said light emitter means includes a plurality of light sources equal in number to the number of code marks on each card, and said light receiving means includes a plurality of light detectors equal in number to said light sources.

7. Apparatus as defined in claim 4, wherein said cards are provided in a plurality of rows, and a plurality of optical code readers are provided, each code reader being associated with a respective row of cards.

8. Apparatus as defined in claim 4, further including means for moving said optical reader with respect to said circular row of cards.

9. Apparatus as defined in claim 4, further including means for moving said circular row of cards with respect to said optical code reader.

* * * * *